G. A. LEIMAN.
MACHINE FOR MAKING HOLLOW GLASS BODIES.
APPLICATION FILED MAY 9, 1918.
1,342,821.
Patented June 8, 1920.
4 SHEETS—SHEET 1.
Fig. 1.
Fig. 2.
Fig. 3.
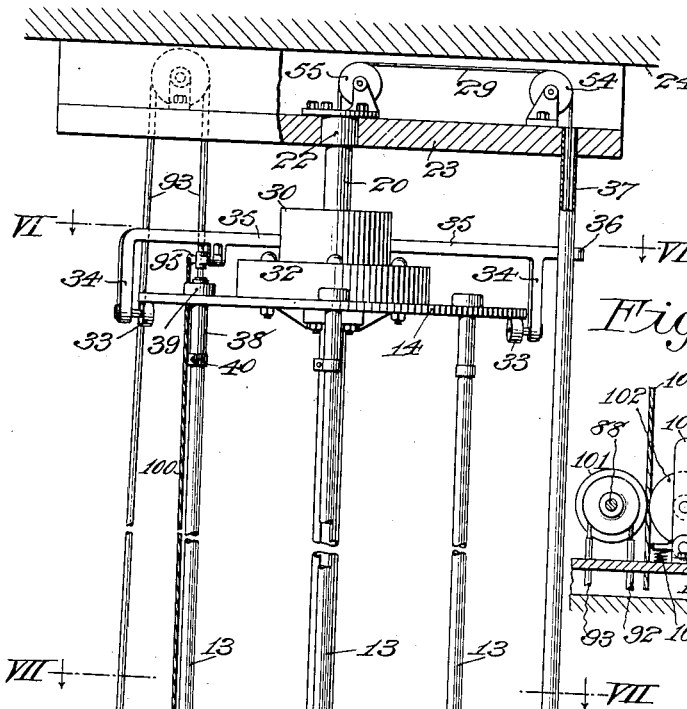
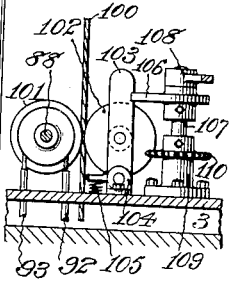
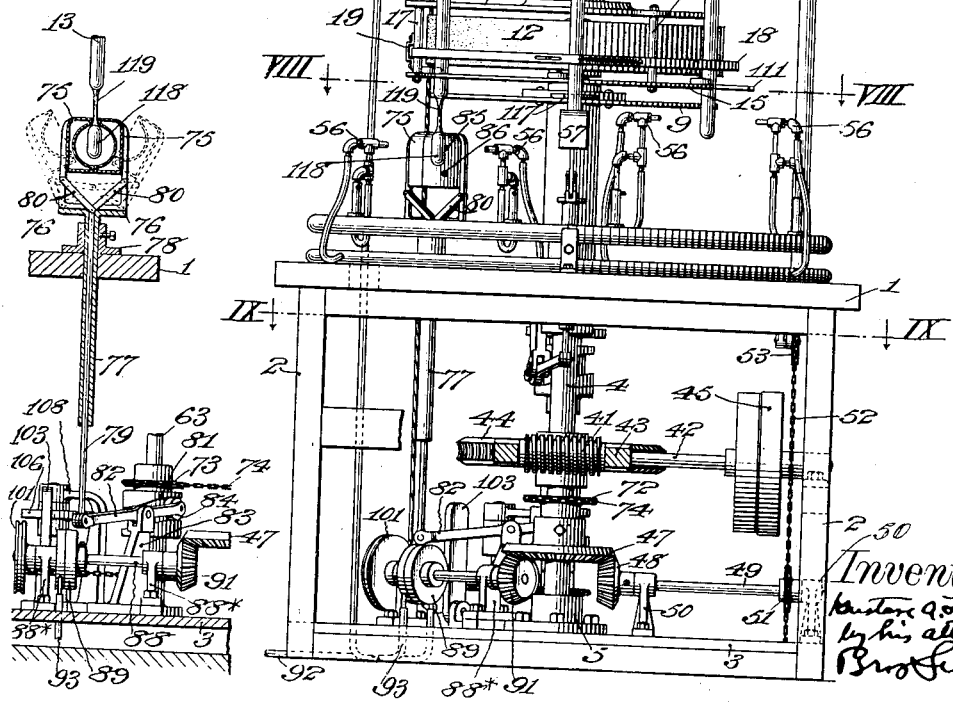
Inventor G. A. LEIMAN.
MACHINE FOR MAKING HOLLOW GLASS BODIES.
APPLICATION FILED MAY 9, 1918.

1,342,821.

Patented June 8, 1920.
4 SHEETS—SHEET 2.

Inventor
Gustav A. Leiman
by his attorneys

G. A. LEIMAN.
MACHINE FOR MAKING HOLLOW GLASS BODIES.
APPLICATION FILED MAY 9, 1918.

1,342,821.

Patented June 8, 1920.
4 SHEETS—SHEET 3.

Inventor
Gustav A. Leiman
by his attorney

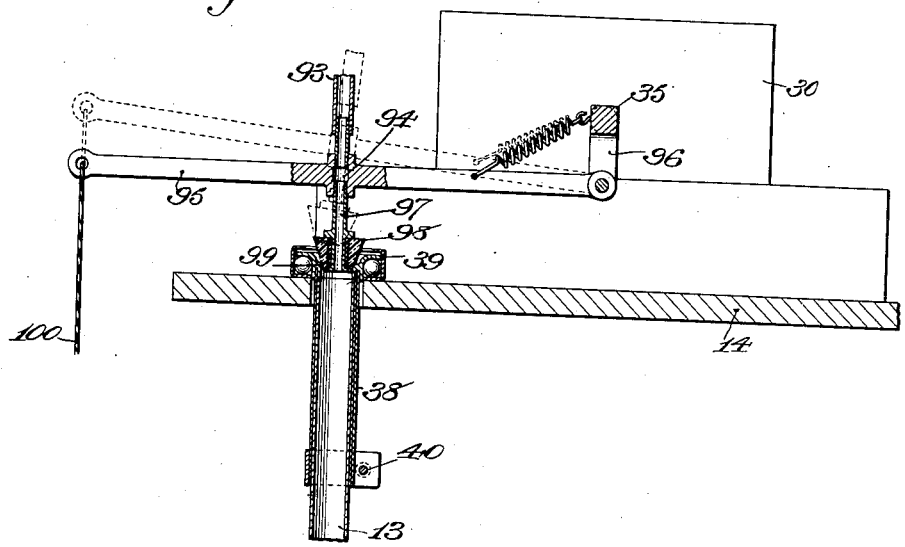
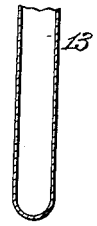
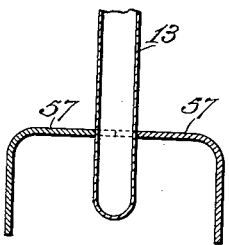
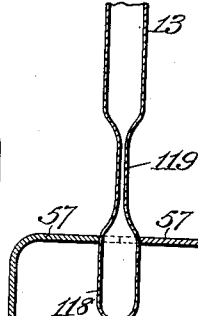
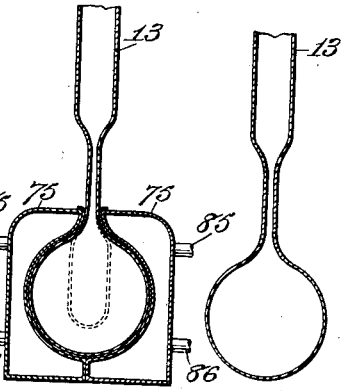
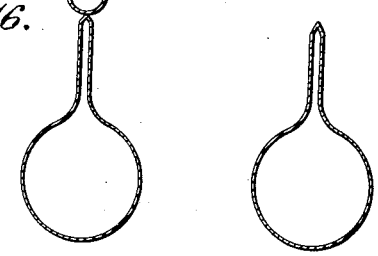

UNITED STATES PATENT OFFICE.

GUSTAVE A. LEIMAN, OF NEW YORK, N. Y.

MACHINE FOR MAKING HOLLOW GLASS BODIES.

1,342,821.  Specification of Letters Patent.  Patented June 8, 1920.

Application filed May 9, 1918. Serial No. 233,432.

*To all whom it may concern:*

Be it known that I, GUSTAVE A. LEIMAN, a citizen of the United States, and resident of the borough of the Bronx, in the city and State of New York, have invented a new and useful Improvement in Machines for Making Hollow Glass Bodies, of which the following is a specification.

This invention relates to machines for making hollow glass bodies and has for its object to provide a machine which is constructed to automatically control the several progressive operations through which the material for making the bodies is passed.

Another object is to provide a machine which will be simple, durable and effective.

A still further object is to provide certain improvements in the form, construction and arrangement of the parts whereby the above named and other objects may be effectively carried out.

A practical embodiment of my invention is represented in the accompanying drawings in which, Figure 1 represents a front elevation of my improved machine having certain parts broken away to more clearly show other parts beyond.

Fig. 2 represents a detail section of the mold and its adjacent operating mechanism.

Fig. 3 represents a detail of the air controlling mechanism.

Fig. 10 represents a detail section on an enlarged scale of the glass tube holder and the oscillating air nozzle applied thereto, and Figs. 11 to 17 inclusive, represent longitudinal sections of the material and adjacent mechanism in the several stages through which the material is passed.

Figure 4:
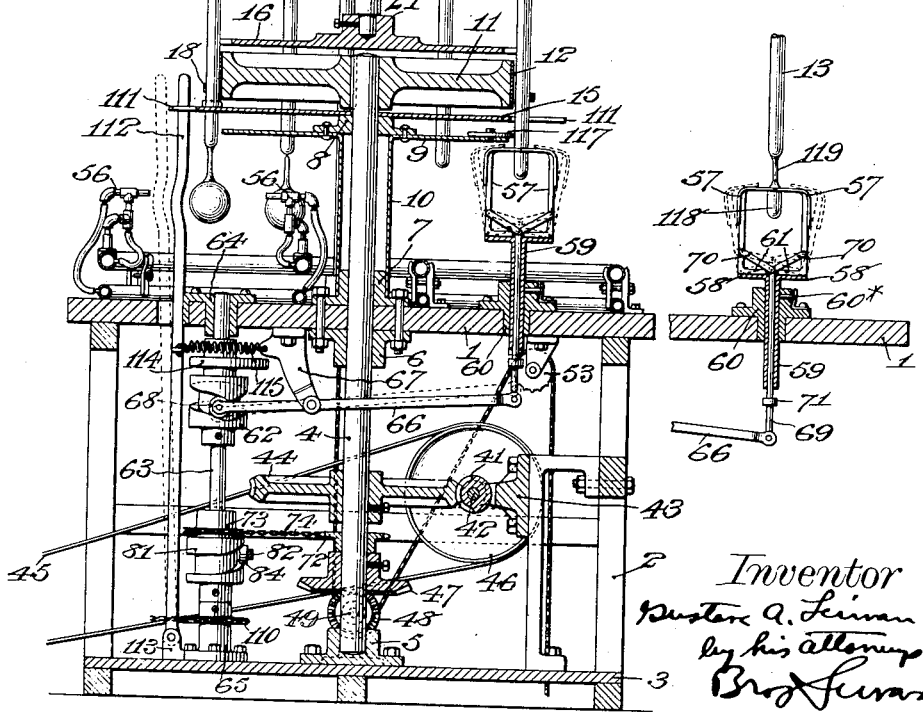
Fig. 4 represents a longitudinal central section taken from front to rear of the machine.

The machine is supported upon a table 1 mounted on a frame 2 which has a shelf 3 arranged near the bottom of the frame in position to receive the driving mechanism to be hereinafter described.

A vertical shaft 4 is stepped in a bearing 5 carried by the shelf 3 and journaled in bearings 6, 7, secured to the table 1. The upper end of the shaft 4 is provided with a bearing 8 fixed on a plate 9 having a tubular member 10 depending therefrom, which member is secured to the bearing 7.

A friction driving wheel 11 is keyed to the upper end of the shaft 4, the surface of which is provided with a yielding element 12, such as canvas, cloth or other suitable material, for receiving the glass tubes 13 to be worked.

The glass tubes 13 are carried in a vertically movable and rotatable carrier which comprises an upper plate 14, a lower plate 15 and an intermediate plate 16. The intermediate plate 16 is spaced from and secured to the lower plate 15, by means of posts 17. The lower plate 15 is located between the driving wheel 11 and the bearing 8.

A yielding band 18 is held in position between the intermediate and lower plate by straps 19 secured to the posts 17, to engage the tubes 13 and hold them in intimate contact with the driving wheel 11 and by which means the carrier receives its rotary motion. The upper plate 14 is arranged to slide vertically on a hollow shaft 20, one end of which shaft is secured in a hub 21 of the intermediate plate 16 and the other end journaled in a bearing 22 carried by a platform 23 depending from a support 24. The plate 14 is rotated by means of a key 25 secured thereto by a bolt 26, which key passes through a slot 27 in the hollow shaft 20 and is provided with a swivel 28 and a flexible connection 29 which controls the vertical movement of the plate. Thus, it will be seen that the plate receives its rotary motion from the shaft 20 through the intermediate plate 16 and may at the same time be given a vertical motion by the flexible connection 29.

To provide a firm bearing for the rotation of the plate 14, a block 30 is mounted to slide on the shaft 20 and has an annular groove 31 arranged to receive an annular gib 32 secured to the plate 14. The outer edge of the plate is supported on rollers 33 carried by arms 34 of the hangers 35 which are secured to the block 30. One of the hangers 35 is provided with an extension 36 which engages a pipe 37 extending from the table 1 to the platform 23, to prevent the block from rotating with the plate 14. Each tube is held in a sleeve 38 of an anti-friction bearing 39 carried by the plate 14, by means of a clamp 40 on the sleeve. In the present instance I have shown a plate arranged to receive six bearings with the tubes spaced equidistant, which may be termed a unit, since each tube is carried by the plate from one stage of development to another and the progressive stages being six in number in one cycle. While I have shown only one unit in a cycle, I wish it understood that there may be installed a plurality of units in one carrier and the same result accomplished in a part of a cycle according to the number of units applied.

Motion is imparted to the shaft 4 by a worm 41 fast on a shaft 42 carried in brackets 43 on the frame 2, which worm 41 meshes with a worm wheel 44 fixed on the shaft 4. The shaft 42 is driven in the present instance by a belt 45 and pulley 46 on the shaft from a source of power (not shown).

The vertical movement of the plate 14 is controlled relatively to the rotary movement of the same, by a bevel gear 47 on shaft 4 which meshes with a bevel gear 48 carried by a shaft 49 mounted in brackets 50 on the shelf 3. A sprocket 51 on the shaft 49 is arranged to receive a sprocket chain 52, one end of which passes upwardly through the pipe 37 and is coupled to the flexible connection 29. The other end of the chain is carried over an idler sprocket 53 and downwardly toward the shelf where it may rest until brought into use.

The flexible connection 29 is maintained centrally of the pipe 37, by a guide pulley 54 located in position on the platform 23. A similar pulley 55 is also arranged on the platform to direct the flexible connection from the swivel 28 in the hollow shaft 20 to the pulley 54.

The tubes 13 extend below the plate 15 a sufficient distance to be brought into and out of the path of a series of flames issuing from burners 56 arranged in position on the table 1. The construction and operation of the burners may be of any well known and approved form and serve no purpose in this invention other than herein specified.

After the tube, in its first stage, as particularly shown in Fig. 11, has been heated by the flames from the the burners, it is drawn downwardly to the position shown in Fig. 13, by means of a vertically movable device which comprises a pair of jaws 57 pivoted in arms 58 on a sleeve 59 which is mounted to slide vertically in a bearing 60 fast on the table 1. The jaws 57 are provided with oppositely disposed feet 61 which engage the sleeve 59 and limit the inward movement of the jaws. The sleeve 59 is reciprocated in the bearing 60 by a cam 62 fixed on a vertical shaft 63 mounted to rotate in a bearing 64 on the table 1 and stepped in a bearing 65 on the shelf 3. A rocking lever 66 is pivoted in a bracket 67 depending from the table, one end of which lever 66 has a truck roller 68 which engages the cam 62 to rock the lever, while the other end is connected to a rod 69 which passes upwardly through the sleeve 59. The upper end of the rod 69 is provided with links 70 pivoted thereon and arranged to connect the jaws 57 above the arms 58 so that the vertical movement of the rod 69 will oscillate the jaws. A stop collar 71 is secured to the rod to engage the sleeve 59 and lift the same in its upward movement while the downward movement of the sleeve is controlled by the links 70 engaging the feet 61 of the jaws. To hold the sleeve against unintentional displacement, I provide a spring-actuated pin 60* which is slidably mounted in the bearing 60 and has a frictional engagement with the sleeve. The movement of the rod 69 is controlled by the cam 62.

The shaft 63 is driven from the shaft 4 by sprockets 72, 73, connected by a chain 74.

A mold performing one of the operations through which the tube is passed, comprises hollow members 75 pivoted on arms 76 carried by a sleeve 77 fixed in a bearing 78 on the table 1. The members 75 are operated by means of a vertically movable rod 79 having links 80 pivoted to the members and upper end of the rod. The rod 79 is reciprocated by means of a cam 81 fast on the shaft 63 and a lever 82 pivoted on a bracket 83 carried by the shelf 3, one end of which lever has a truck roller 84 arranged to engage the cam 81, while the other end is connected to the lower end of the rod 79. Each member 75 is provided with a compartment which has an inlet pipe 85 and an outlet pipe 86, through which pipes water may pass to keep the mold at a desired temperature.

In conjunction with the operation of the mold, a rotary air controlling valve 89, of any well known and approved form, is secured to a shaft 88 mounted in brackets 88* on the shelf 3 and driven from the shaft 4, through a bevel gear 47 on the shaft 4, which meshes with a bevel gear 91 fast on the end of the shaft 88. Air is supplied to the valve 89 from a source of supply (not shown), by a pipe 92 and passes from the valve through a flexible pipe 93 which is carried upwardly to one side of a coupling 94 supported in spring actuated rocking arms 95 pivoted on a depending lug 96 on the hanger 35. The lower end of the coupling 94 is provided with a nipple 97 which has a yielding nozzle 98 adapted to engage a seat 99 in the bearings 39, by which means the air is passed into the tube and downwardly therethrough to the body to be formed in the mold. The arm 95 is periodically rocked by means of a flexible connection 100 which is secured to the outer end of the arm 95 and arranged to pass downwardly between sheave pulleys 101, 102. The pulley 101 is fixed to rotate continuously with the shaft 88 and the pulley 102 mounted on a rocking arm 103, pivoted in a bracket 104 on the shelf 3, which arm is arranged to hold the pulley 102 normally out of engagement with the pulley 101 by means of a spring 105. The arm 103 is intermittently actuated by a cam 106 fast on a shaft 107 mounted in a bracket 108 and stepped in a bearing 109 carried by the shelf 3. The shaft 107 is driven from the shaft 63 by a sprocket and chain connection 110.

In order that the tubes 13 may be brought to the desired position relative to the operation at the different stages of development, I provide the lower plate 15 with a series of projections 111, the number corresponding to the number of tubes which form the unit, in the present instance six, which projections are adapted to engage a swinging stop lever 112 pivoted in a bracket 113 on the shelf 3, which stop lever is arranged to be oscillated by means of a cam 114 fixed on the shaft 63. This cam 114 is arranged to move the stop lever out of engagement with the projection 114 after each operation on the tube has been performed.

The stop lever is yieldingly brought into the path of the projections by a spring 115, one end of which is secured to the bracket 67 and the other end to the stop lever.

Figure 8:
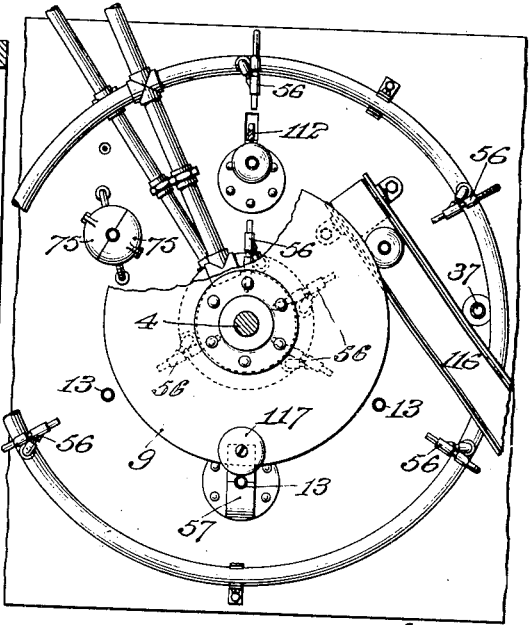
Fig. 8 represents a horizontal section taken in the plane of the line VIII—VIII of Fig. 1, looking in the direction of the arrows.

A traveling apron 116, a portion of which is shown in Fig. 8 in position on the table in the path of the completed body so that it will fall thereon and be carried away from the machine, may be driven from a suitable source of power (not shown), and at a speed sufficient to keep the next succeeding body from touching the one previously deposited thereon.

In proceeding to describe the operation of the machine, I deem it an advantage in order to facilitate a better understanding of the machine, to term the different operations through which each tube passes, as "stages." The first stage being the heating of the tube; the second stage that of drawing the tube; the third stage that of heating the drawn bulb; the fourth stage that of blowing the bulb in the mold; the fifth stage that of annealing the blown body and the sixth stage that of sealing and severing the blown body from the tube. These different stages through which each tube passes may be termed a unit, and as each tube is passed progressively I will only describe the operation with respect to one tube.

Figure 5:
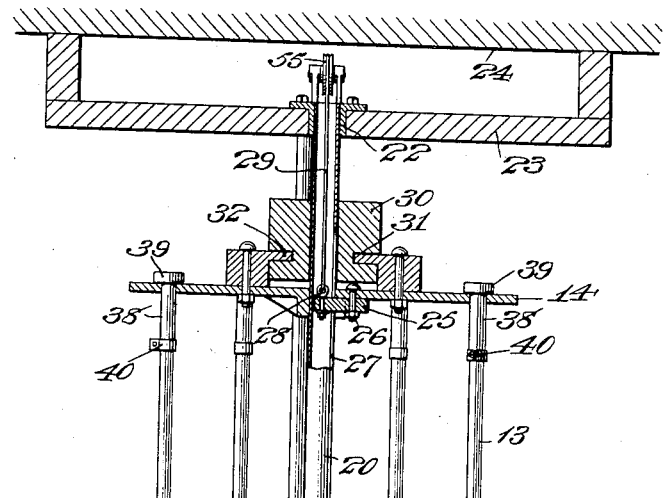
Fig. 5 represents a detail section of the device for drawing the glass.
Figure 6:
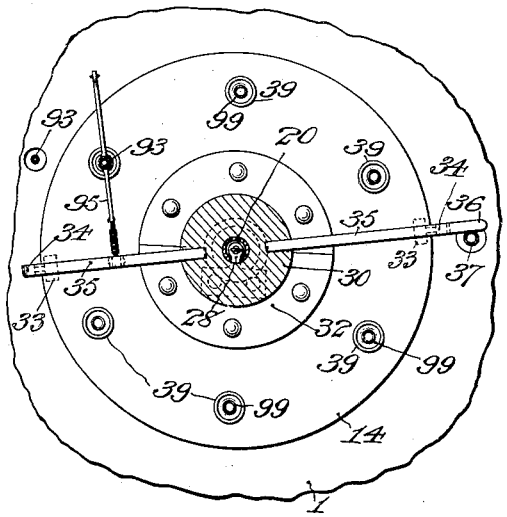
Fig. 6 represents a horizontal section taken in the plane of the line VI—VI of Fig. 1, looking in the direction of the arrows.
Figure 7:
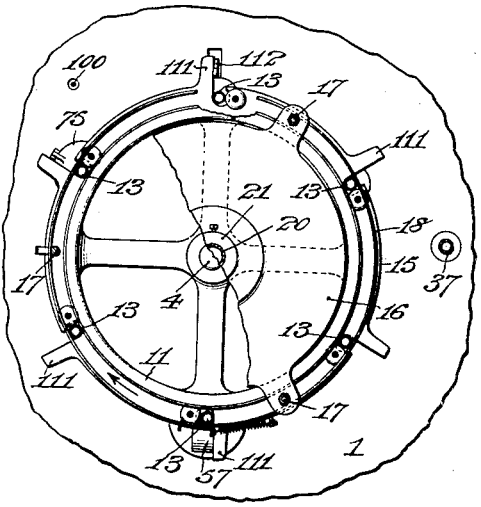
Fig. 7 represents a horizontal section taken in the plane of the line VII—VII of Fig. 1, looking in the direction of the arrows.
Figure 9:
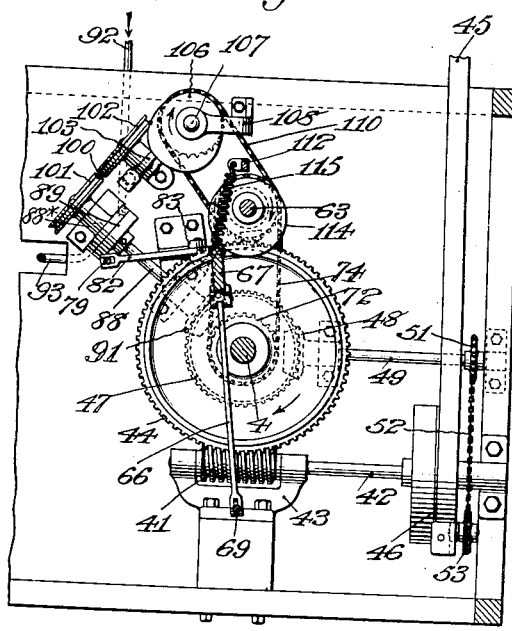
Fig. 9 represents a horizontal section taken in the plane of the line IX—IX, looking in the direction of the arrows.

Assuming the shaft 4 and driving wheel 11 are driven at a constant speed through the driving connection and the tube 13 held to the surface 12 of the wheel 11 by the yielding band 18, the tube will be caused to rotate in its bearing 39 at the surface speed of the wheel 11. The tube will continue to rotate about its axis until the cam 114 engages the stop lever 112 and moves it outwardly out of the path of the projections 111, when the rotary motion of the tube will be stopped and the tube held to the wheel by the band 18 so that the motion will be transmitted by the tubes to the lower plate 15, from thence to the intermediate plate 16, shaft 20 and upper plate 14. After the projection has passed the stop lever 112, the lever will return to its normal position where it remains in the path of the next projection. When the projection arrives at the stop lever, the tube will have been brought to the second stage of the operation. In this stage I do not desire to rotate the tube, and have placed a roller 117 in position on the flange 9, so that the periphery of the roller will engage the tube and hold it out of contact with the wheel 11 throughout this second operation. The tube, having been previously heated, will now be in position to be engaged by the jaws 57 which are brought into action by the cam 62 which actuates the lever 66 to lift the rod 69 and stop collar 71 which raises the sleeve 59 with the jaws open to the position, as shown in dotted outline in Fig. 4. The downward movement of the rod will, through the links 70, cause the jaws 57 to close on the tube and then draw the sleeve, jaws and heated portion of the tube downwardly to the position shown in Fig. 5. In drawing the heated portion of the tube downwardly, the lower end will be formed into what may be termed for convenience, a "bulb" 118 which is connected by a neck 119 to the tube. From this position the rod will be moved upwardly and allow the jaws to open and release the bulb. At this time the cam 114 again moves the lever 112 outwardly and as above described, the plate 15 will be rotated until the next projection engages the stop lever.

The third stage of operation consists in heating bulb. From this stage the heated bulb is passed to the fourth stage where it is in position directly over the open mold, the members of which are shown in dotted outline in Fig. 2. Upon arriving at this position, the cam 81 actuates the lever 82 through the truck roller 84, so that the rod 79 will be drawn downwardly in the sleeve 77, thereby closing the member 75 on the bulb by the links 80. Immediately after the members have closed on the bulb, the cam 106 rocks the lever 103 which forces the sheave pulley 102 into contact with the pulley 101 which is being constantly rotated through the bevel gear 91 on the shaft 88, meshing with the bevel gear 47 on the shaft 4. As the pulleys 101, 102 are brought together, the flexible connection 100, which is located therebetween, will be gripped and pulled downwardly until the cam 106 releases the lever 103, when the connection will be returned to its normal position by the spring actuated arm 95. This downward movement of the arm 95 causes the yielding nozzle 98 to be seated in the bearing immediately beneath it, thus forming an unbroken communication with the flexible air pipe 93, as shown in Fig. 10. Simultaneously with the seating of the nozzle 98, the air valve 89 will open communication with the air supply pipe 92, by the rotation of the shaft 88 and air will be passed through the pipe 93, coupling 94, nipple 97, into the tube 13 carried by the bearing 39 and downwardly into the bulb located in the members 75 of the mold. The air thus injected into the bulb is sufficient to perform the blowing operation, in which the bulb now becomes a "blown body," after which the air is automatically cut off by the rotation of the valve 89 on its shaft 88. After the air has been cut off, the cam 81 will have reached a position to move the lever 82 upwardly in the sleeve 77, so that the members 75 will be forced outwardly by the links 80, leaving the blown body to be passed to the next stage. Simultaneously with the movement of the rod 79, the cam 106 will be moved so that the lever 103 may be returned by its spring and the flexible connection 100 liberated, allowing the spring actuated arm 95, with the nozzle, nipple, coupling and air pipe to return to its normal position. When the parts last mentioned are in their normal position, the cam 115 will have again been brought to a position to actuate the stop lever 112 which will be moved out of the path of the projection 111 and the tube brought into contact with the continuously rotating wheel 11 which will carry the tube and its blown body to the fifth stage. In this stage, the blown body is again heated by the flames from the burners in this position for the purpose of annealing.

At the predetermined time the cam 115 again actuates the stop lever 112, as previously described, and the tube with the annealed blown body carried to the sixth stage, where the flames from the burners at this point are directed to the top of the neck 119 for the purpose of sealing and cutting it from the tube. After the neck is sealed and cut from the tube, it is allowed to fall upon the traveling apron 116 and carried away from the machine for further manipulation as desired.

During the cycle of operation, above described, the shaft 4 by its bevel gear 47, has rotated the shaft 49 through its bevel gear 48, a predetermined number of revolutions which, by means of the sprocket 51, chain 52 and flexible connection 29 has allowed the plate 14 carrying the tubes to be lowered a distance sufficient to compensate for the part of the tube removed.

It is to be understood that various changes may be resorted to in the form, construction and arrangement of the several parts without departing from the spirit and scope of my invention; and hence I do not intend to be limited to the details herein shown and described, except as they may be specifically included in the claims.

What I claim is:

1. A machine of the character described comprising a vertically movable glass tube carrier and progressively operating means for heating the tube, drawing the tube to form a bulb and neck thereon, blowing said bulb, sealing said neck and tube and cutting the neck from the tube.

2. A machine of the character described comprising a vertically movable carrier for a plurality of glass tubes and progressively operating means for heating the tubes, drawing the tubes to form bulbs and necks thereon, blowing said bulbs, sealing the necks and tubes and cutting the necks from the tubes.

3. A machine of the character described comprising a vertically movable glass tube carrier and progressively operating means for heating the tube, drawing the tube to form a bulb and neck thereon, blowing said bulb, annealing said blown bulb, sealing the bulb neck and tube and cutting the neck from the tube.

4. A machine of the character described comprising a vertically movable carrier for a plurality of glass tubes and progressively operating means for heating the tubes, drawing the tubes to form bulbs and necks thereon, blowing said bulbs, annealing said blown bulbs, sealing the necks and tubes and cutting the necks from the tubes.

5. A machine of the character described comprising a vertically movable glass tube carrier, means for rotating said carrier and progressively operating means for heating the tube, drawing the tube to form a bulb and neck thereon, blowing said bulb, sealing said neck and tube and cutting the neck from the tube.

6. A machine of the character described comprising a vertically movable carrier for a plurality of glass tubes, means for rotating said carrier and progressively operating means for heating the tubes, drawing the tubes to form bulbs and necks thereon, blowing said bulbs, sealing said necks and tubes and cutting the necks from the tube.

7. A machine of the character described comprising a vertically movable glass tube carrier and progressively operating means for heating the tube, drawing the tube to form a bulb and neck thereon, blowing said bulb, sealing the neck and tube and cutting the neck from the tube, and means for moving the carrier downwardly to feed the tube.

8. A machine of the character described comprising a vertically movable carrier for a plurality of glass tubes and progressively operating means for heating the tubes, drawing the tubes to form bulbs and necks thereon, blowing said bulbs, sealing the necks and tubes and cutting the necks from the tubes, and means for moving the carrier downwardly to feed the tubes.

9. A machine of the character described comprising a vertically movable glass tube carrier, means for rotating said carrier and progressively operating means for heating the tube, drawing the tube to form a bulb and neck thereon, blowing said bulb, sealing the neck and tube and cutting the neck from the tube, and means for moving the carrier downwardly to feed the tube.

10. A machine of the character described comprising a vertically movable carrier for a plurality of glass tubes, means for rotating said carrier and progressively operating means for heating the tubes, drawing the tubes to form bulbs and necks thereon, blowing said bulbs, sealing the necks and tubes and cutting the necks from the tubes, and means for moving the carrier downwardly to feed the tubes.

11. A machine of the character described comprising a vertically movable and horizontally rotatable carrier for a glass tube, and means for rotating the tube about its axis and for revolving the tube about the axis of the carrier.

12. A machine of the character described comprising a vertically movable and horizontally rotatable carrier for a plurality of glass tubes, and means for rotating the tubes about their axes and for revolving the tubes about the axis of the carrier.

13. A machine of the character described comprising a vertically movable and horizontally rotatable carrier for a glass tube, and means for intermittently rotating the tube about its axis and for intermittently revolving the tube about the axis of the carrier.

14. A machine of the character described comprising a vertically movable and horizontally rotatable carrier for a plurality of glass tubes, and means for intermittently rotating the tubes about their axes and for intermittently revolving the tubes about the axis of the carrier.

15. A machine of the character described including a vertically movable heated glass tube carrier, a vertically reciprocating member, jaws carried thereby and means for moving the jaws laterally into engagement with the tube and the jaws and member downwardly to draw the tube to form a bulb and neck on the tube.

16. A machine of the character described including a vertically movable heated glass tube carrier, a vertically reciprocating member, jaws pivoted thereon and means for swinging the jaws laterally into engagement with the tube and moving the jaws and member downwardly to draw the tube to form a bulb and neck on the tube.

17. A machine of the character described including a vertically movable heated glass tube carrier, a vertically reciprocating member, jaws pivoted thereon, and a vertically reciprocating rod having a lost motion connection with said member and connecting said jaws for swinging the jaws laterally into engagement with the tube and the jaws and member downwardly to draw the tube to form a bulb and neck on the tube.

18. A machine of the character described including a vertically movable heated glass tube carrier, a vertically reciprocating member, jaws pivoted thereon, a vertically reciprocating rod having a lost motion connection with said member, and links connecting said rod and jaws for swinging the jaws laterally into engagement with the tube and the jaws and member downwardly to draw the tube to form a bulb and neck on the tube.

19. A machine of the character described including a vertically movable heated glass tube carrier, a support, a vertically reciprocating member frictionally slidable in said support, jaws pivoted on said member and a vertically reciprocating rod having a lost motion connection with said member and connecting said jaws for swinging the jaws laterally into engagement with the tube and the jaws and member downwardly to draw the tubes to form a bulb and neck on the tube.

20. A machine of the character described including a vertically movable and horizontally rotatable carrier for holding a glass tube having a heated bulb thereon, against longitudinal movement in the carrier, a mold for receiving said bulb to be blown therein, said mold comprising a support, members movable thereon and means for operating said members.

21. A machine of the character described including a vertically movable and horizontally rotatable carrier for holding a glass tube, said tube having a heated bulb thereon against longitudinal movement in the carrier, a mold for receiving said bulb to be blown therein, said mold comprising a support, members pivoted thereon and means for operating said members.

22. A machine of the character described including a vertically movable and horizontally rotatable carrier for a glass tube having a heated bulb, a mold receiving said bulb to be blown therein, said mold comprising a support, members pivoted thereon, a rod slidable in said support connecting said members and means for reciprocating said rod to operate the members.

23. A machine of the character described including a vertically movable and horizontally rotatable carrier for a glass tube having a heated bulb, a mold for receiving said bulb to be blown therein, said mold comprising a support, members pivoted thereon, a rod slidable in said support having links connecting said members and means for reciprocating said rod to operate the members.

24. A machine of the character described including a vertically movable glass tube carrier having a sleeve for receiving a tube, a clamp on said sleeve for securing the tube therein, and an antifriction bearing for the sleeve mounted on said carrier.

25. A machine of the character described including a vertically movable glass tube carrier having a sleeve for receiving a tube, a clamp on said sleeve for securing the tube therein, and an antifriction bearing for the sleeve mounted on said carrier, and an air supply pipe adapted to be removably connected to said bearing for injecting air into the tube.

26. A machine of the character described including a vertically movable glass tube carrier having a sleeve for receiving a tube, a clamp on said sleeve for securing the tube therein, an antifriction bearing for the sleeve mounted on said carrier, an air supply pipe adapted to be removably connected to said bearing for injecting air into the tube, and means for controlling the air supply.

27. A machine of the character described including a vertically movable glass tube carrier having a sleeve for receiving a tube, a clamp on said sleeve for securing the tube therein, an antifriction bearing for the sleeve mounted on said carrier, an air supply pipe adapted to be removably connected to said bearing for injecting air into the tube and a rotary valve for controlling the air supply.

28. A machine of the character described including a vertically movable glass tube carrier having a sleeve for receiving a tube, a clamp on said sleeve for securing the tube therein, an antifriction bearing for the sleeve mounted on said carrier, a spring actuated arm having a nozzle for engaging said bearing, an air supply pipe connected to said nozzle for injecting air into the tube and means for oscillating said arm and controlling the air supply.

29. A machine of the character described including a tube carrier having a sleeve for receiving a tube, a clamp on said sleeve for securing the tube therein, an antifriction bearing for the sleeve mounted on said carrier, a spring actuated arm having a nozzle for engaging said bearing, an air supply pipe connected to said nozzle for injecting air into the tube and means for oscillating said arm and controlling the air supply, said means comprising a continuously rotating pulley, an oscillating pulley, a flexible connection engaging the arm and interposed between said pulleys to engage the flexible connection and oscillating arm.

30. A machine of the character described including a tube carrier having a sleeve for receiving a tube, a clamp on said sleeve for securing the tube therein, an antifriction bearing for the sleeve mounted on said carrier, a spring actuated arm having a nozzle for engaging said bearing, an air supply pipe connected to said nozzle for injecting air into the tube and means for oscillating said arm and controlling the air supply, said means comprising a continuously rotating pulley, an oscillating pulley, a flexible connection engaging the arm and interposed between said pulleys, and a cam for rocking said oscillating pulley to engage the flexible connection and oscillate the arm.

31. A machine of the character described comprising a horizontally rotatable glass tube carrier, means for rotating the tube about its axis in the carrier and revolving the tube about the axis of the carrier, said means comprising a driving wheel and a means engaging the tube for holding it in contact with said wheel.

32. A machine of the character described comprising a horizontally rotatable glass tube carrier, means for rotating the tube about its axis in the carrier and revolving the tube about the axis of the carrier, said means comprising a driving wheel and a means yieldingly engaging the tube for holding it in contact with said wheel.

33. A machine of the character described comprising a horizontally rotatable glass tube carrier, means for rotating the tube about its axis in the carrier, and revolving the tube about the axis of the carrier, said means comprising a driving wheel, a means yieldingly engaging the tubes for holding them in contact with said wheel and means engaging one or more tubes for throwing it or them out of contact with the wheel at predetermined points during the rotation of the carrier.

In testimony that I claim the foregoing as my invention, I have signed my name this 6th day of May, 1918.

GUSTAVE A. LEIMAN.